(12) United States Patent
Bravo et al.

(10) Patent No.: US 10,169,759 B2
(45) Date of Patent: Jan. 1, 2019

(54) VERIFYING ONLINE TRANSACTION INTEGRITY AND AUTHENTICATION WITH QR CODES

(71) Applicant: International Business Machines Corporation, Armonk, NY (US)

(72) Inventors: Jose F. Bravo, Old Greenwich, CT (US); Jeffery L. Crume, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 14/821,924

(22) Filed: Aug. 10, 2015

(65) Prior Publication Data

US 2017/0046699 A1 Feb. 16, 2017

(51) Int. Cl.
| | |
|---|---|
| G06Q 40/00 | (2012.01) |
| G06Q 20/40 | (2012.01) |
| G06K 19/06 | (2006.01) |
| G06K 7/14 | (2006.01) |

(52) U.S. Cl.
CPC ......... G06Q 20/405 (2013.01); G06K 7/1417 (2013.01); G06K 19/06037 (2013.01)

(58) Field of Classification Search
CPC .................................................. G06Q 20/405
USPC ...................................................... 705/15, 75
See application file for complete search history.

(56) References Cited

U.S. PATENT DOCUMENTS

| | | | |
|---|---|---|---|
| 7,133,662 B2 | 11/2006 | Bravo et al. | |
| 7,715,823 B2 | 5/2010 | Bravo et al. | |
| 7,793,155 B2 | 9/2010 | Belvin et al. | |
| 8,522,349 B2 | 8/2013 | Crume | |
| 8,533,821 B2 | 9/2013 | Crume | |
| 8,683,609 B2 | 3/2014 | Bravo et al. | |
| 8,762,724 B2 | 6/2014 | Bravo et al. | |
| 8,838,988 B2 | 9/2014 | Bravo et al. | |

(Continued)

FOREIGN PATENT DOCUMENTS

| | | |
|---|---|---|
| JP | 2008152737 A | 7/2008 |
| WO | 2014122614 A2 | 8/2014 |

(Continued)

OTHER PUBLICATIONS

Andrade, Greg; "Choosing the Best and Safest Two-factor Authentication Method"; SecSign Technologies; Sep. 5, 2014; pp. 1-6; <https://www.secsign.com/best-safest-two-factor-authentication-method/>.

(Continued)

*Primary Examiner* — Samica L Norman
(74) *Attorney, Agent, or Firm* — Daniel R. Simek

(57) ABSTRACT

Embodiments of the present invention provide a method, computer program product, and computer system for verifying transactions over a network. The method includes initiating a proposed transaction with a transaction server. The transaction server provides encoded details of the proposed transaction, in the form of a QR code, to the user. The QR code is scanned using a computing device, and is decoded using an application on the computing device. A set of transaction details associated with the decoded QR code is compared with the details of the proposed transaction. The proposed transaction is then confirmed or aborted using a separate communication channel.

20 Claims, 4 Drawing Sheets

(56) References Cited

U.S. PATENT DOCUMENTS

| | | |
|---|---|---|
| 8,917,826 B2 | 12/2014 | Bravo et al. |
| 2008/0318548 A1 | 12/2008 | Bravo et al. |
| 2010/0269162 A1 | 10/2010 | Bravo et al. |
| 2013/0086650 A1 | 4/2013 | Soundrapandian et al. |
| 2013/0124425 A1* | 5/2013 | Agrawal ............... H04L 9/3247 705/75 |
| 2015/0088758 A1 | 3/2015 | Varadarajan et al. |
| 2015/0178721 A1* | 6/2015 | Pandiarajan ......... G06Q 20/382 705/75 |
| 2016/0063473 A1* | 3/2016 | Lee .................... G06Q 30/0633 705/15 |
| 2017/0039559 A1* | 2/2017 | Frieden ................. G06Q 20/40 |

FOREIGN PATENT DOCUMENTS

| | | |
|---|---|---|
| WO | 2015014383 A1 | 2/2015 |
| WO | 2015031843 A1 | 3/2015 |

OTHER PUBLICATIONS

Shamal et al.; "Secure Authentication for Online Banking Using QR Code"; International Journal of Emerging Technology and Advanced Engineering; Mar. 2014; pp. 778-781; vol. 4; Issue 3.

* cited by examiner

VERIFYING ONLINE TRANSACTION INTEGRITY AND AUTHENTICATION WITH QR CODES

BACKGROUND OF THE INVENTION

The present invention relates generally to the field of online transactions, and more particularly to securing the integrity of online transactions using out of band communication.

In cryptography and computer security, a man-in-the-middle (MITM) attack is an attack where the attacker secretly relays, and possibly alters, the communication between two parties who believe they are directly communicating with each other. One example is active eavesdropping, in which the attacker makes independent connections with the victims and relays messages between them to make them believe they are talking directly to each other over a private connection, when in fact the entire conversation is controlled by the attacker.

Quick Response (QR) Codes are a type of matrix barcode (or two-dimensional barcode). A barcode is a machine-readable optical label that contains information about the item to which it is attached. A QR code uses four standardized encoding modes (numeric, alphanumeric, byte/binary, and kanji) to efficiently store data; extensions may also be used. The QR Code system has become popular due to its fast readability and greater storage capacity compared to standard Universal Product Code (UPC) barcodes. Applications include product tracking, item identification, time tracking, document management, and general marketing. A QR code consists of black modules (square dots) arranged in a square grid on a white background, which can be read by an imaging device (such as a camera) and processed using Reed-Solomon error correction until the image can be appropriately interpreted. The required data are then extracted from patterns present in both horizontal and vertical components of the image.

SUMMARY

A method, computer program product, and computer system for verifying transactions over a network are provided, comprising: providing, by a registered user, details of a proposed transaction to a transaction server; providing, by the transaction server, to the registered user, a QR code, wherein the QR code comprises encoded details of the proposed transaction; scanning, by a first computing device, the QR code; decoding, by an application of the first computing device, the QR code; comparing, by one or more computer processors, a set of transaction details associated with the decoded QR code to the details of the proposed transaction; and confirming, by a separate communication channel, the proposed transaction.

DETAILED DESCRIPTION

Online transactions may be at risk of tampering due to the actions of a man-in-the-middle (MITM), who is positioned between the user and the transaction server. In such a scenario, the server believes it is communicating directly with the user and the user directly with the server. However, both parties are actually interacting with the MITM, who is intercepting and potentially modifying details of the transaction. Embodiments of the present invention provide systems and methods for a user to verify transaction details using Quick Response (QR) codes that exposes tampering by an MITM.

Figure 1:
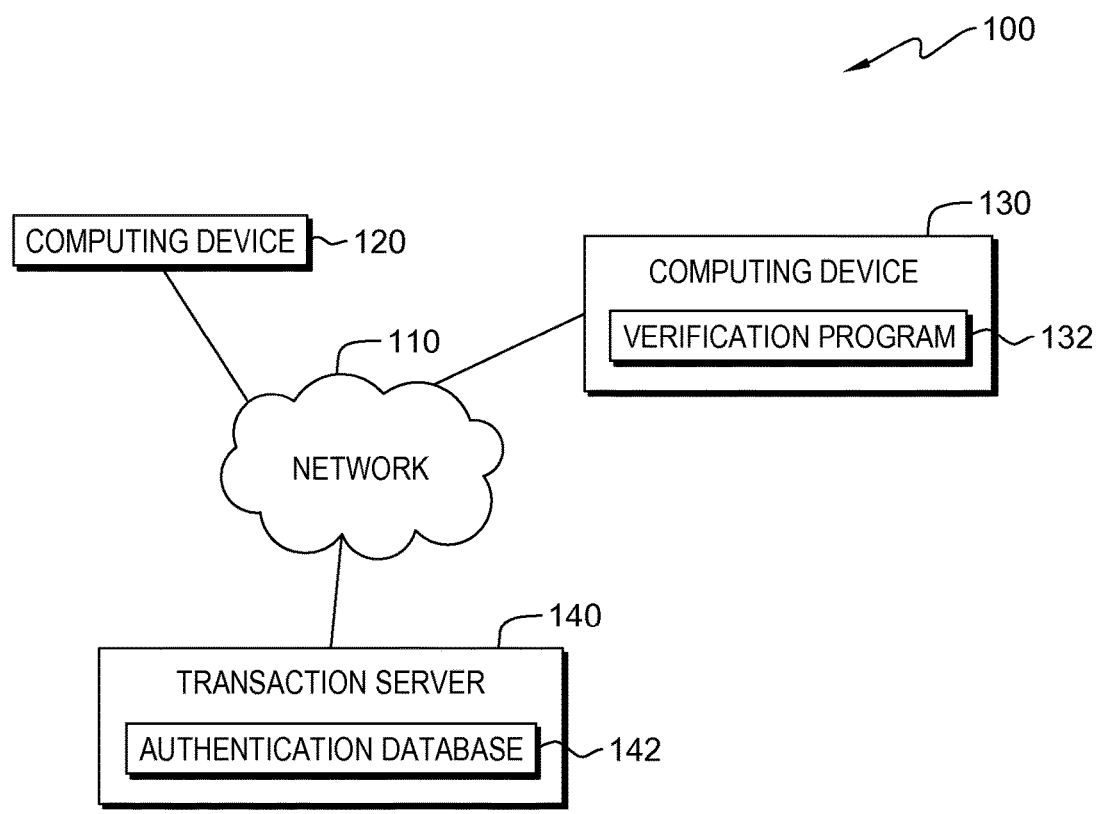
FIG. 1 is a functional block diagram illustrating an online transaction verification environment, in accordance with an embodiment of the present invention.

The present invention will now be described in detail with reference to the figures. FIG. 1 is a functional block diagram illustrating an online transaction verification environment, generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, online transaction verification environment 100 includes computing device 120 and computing device 130 connected to transaction server 140 over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication between transaction server 140 and computing devices 120 and 130.

Computing device 120 and computing device 130 may be a computing device, such as a laptop computer, a tablet computer, a netbook computer, a personal computer (PC), a desktop computer, a personal digital assistant (PDA), a smart phone or wearable device, a thin client, or any programmable electronic device capable of communicating with transaction server 140 via network 110. In other embodiments, computing device 120 and computing device 130 may be a management server, a web server, or any other electronic device or computing system capable of receiving and sending data. Computing device 120 and computing device 130 may include internal and external hardware components, as depicted and described in further detail with respect to FIG. 4. In this exemplary embodiment, computing device 120 includes a web browser capable of displaying a QR code. In another embodiment, computing device 120 is an automated teller machine (ATM) capable of displaying a QR code.

Computing device 130 includes verification program 132 and is pre-registered with transaction server 140. Transaction server 140 associates a user with a specific computing device 130 and stores this data in authentication database 142. Verification program 132 is capable of decoding QR codes, presenting the decoded details to the user, and prompting the user to confirm or abort the transaction. In this exemplary embodiment, verification program 132 processes requests from transaction server 140.

Transaction server 140 sends QR codes to computing device 120 and includes authentication database 142. Transaction server 140 may be a management server, a web server, or any other electronic device or computing system capable of receiving and sending data. In other embodiments of the present invention, transaction server 140 can represent a computing system utilizing clustered computers and components to act as a single pool of seamless resources when accessed through a network. In this exemplary embodiment, transaction server 140 is capable of receiving requests for data from computing device 120 and computing device 130, via network 110. Transaction server 140 may include internal and external hardware components, as depicted and described in further detail with respect to FIG. 4.

Authentication database 142 is a central storage for a set of user registered device data. Authentication database 142 can be implemented using any non-volatile storage medium known in the art. For example, authentication database can be implemented with a tape library, optical library, one or more independent hard disk drives, or multiple hard disk drives in a redundant array of independent disks (RAID). In this exemplary embodiment, authentication database 142 contains the computing device information for each registered user. For example, authentication database 142 may contain the serial number of a mobile cellular device and the name of the user who registered it.

Figure 2:
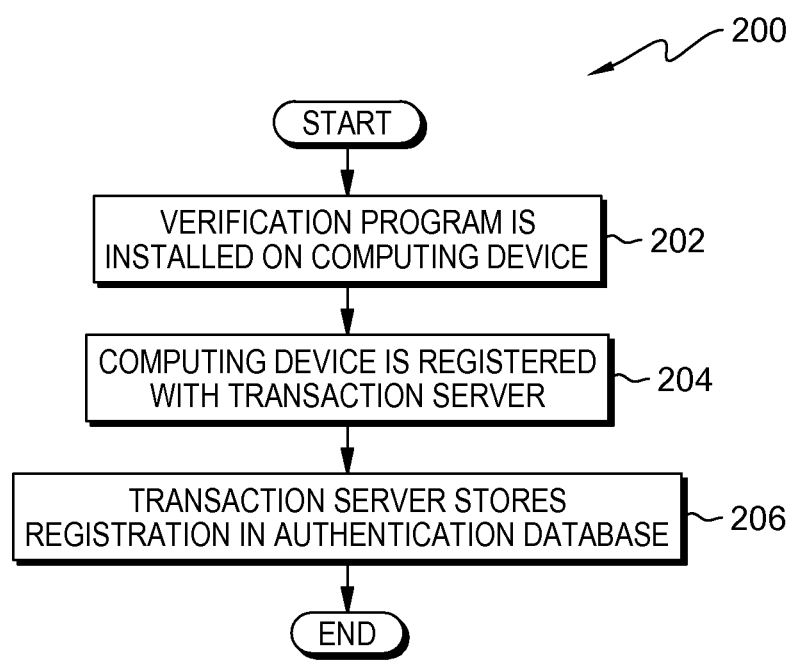
FIG. 2 is a flowchart depicting operational steps for setting up an online transaction verification program, in accordance with an embodiment of the present invention.

FIG. 2 is a flowchart, 200, depicting operational steps for setting up an online transaction verification program, in accordance with an embodiment of the present invention.

In step 202, verification program 132 is installed on computing device 130. In this exemplary embodiment, verification program 132 must be installed on computing device 130 prior to performing the transaction.

In step 204, computing device 130 is registered with transaction server 140. In this exemplary embodiment, this registration step allows transaction server 140 to associate the user with the specific computing device 130.

In step 206, transaction server 140 stores the registration data in authentication database 142.

Figure 3:
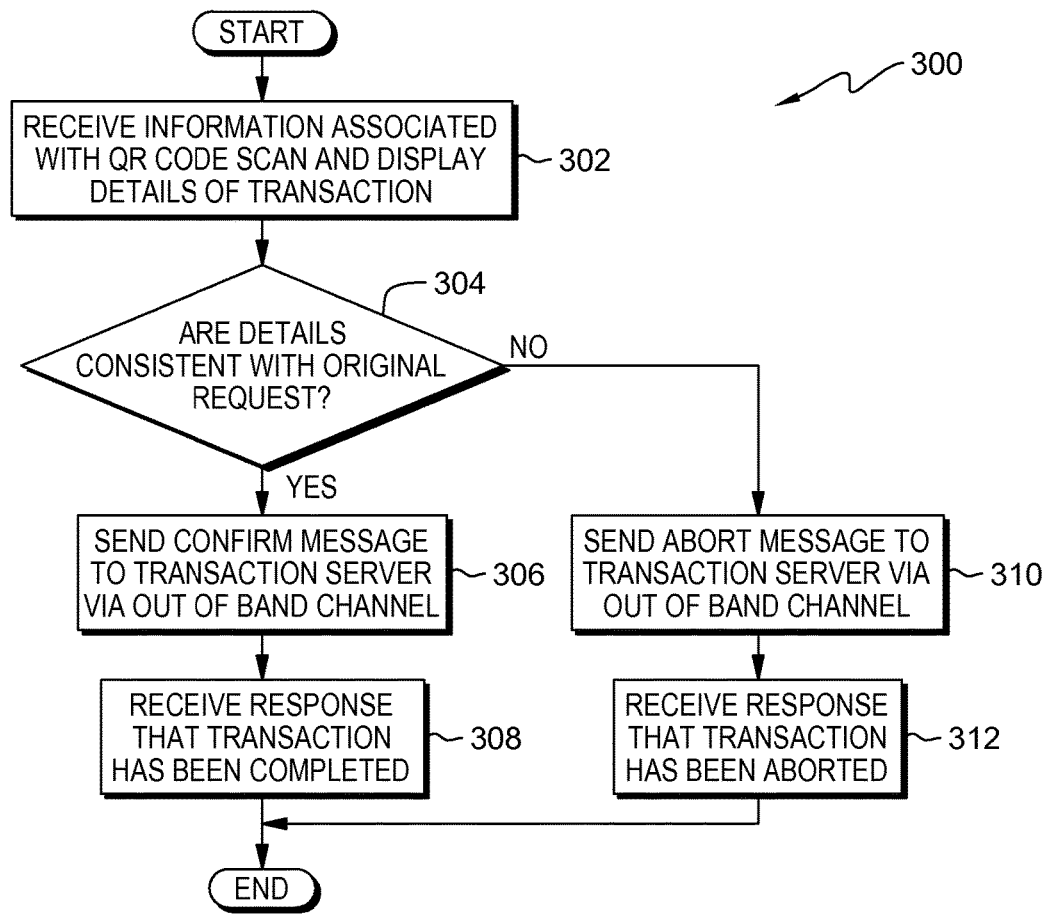
FIG. 3 is a flowchart depicting operational steps for verifying online transaction integrity and authentication, in accordance with an embodiment of the present invention.

FIG. 3 is a flowchart, 300, depicting operational steps for verifying online transaction integrity and authentication, in accordance with an embodiment of the present invention.

In step 302, verification program 132 receives information associated with a QR code scan and displays the transaction details on computing device 130. In this exemplary embodiment, computing device 120 receives a QR code containing encoded transaction details from transaction server 140, via network 110 for the current online transaction being performed between computing device 120 and transaction server 140. The online transaction is initiated by a user on computing device 120 that is received by transaction server 140. Transaction server 140 generates a QR code and sends it back to computing device 120 for verification. It should be appreciated, that computing device 130 is preregistered with transaction server 140, such that verification program 132 associates computing device 130 with a user. The QR code is scanned using computing device 130, and verification program 132 decodes the transaction details. For example, a transaction may involve a user request to transfer money from a checking account to a savings account using computing device 120. In this example, transaction server 140 is the bank server used to conduct online banking transactions. In this exemplary embodiment, the user can view the details of the online transaction between computing device 120 and transaction server 140 using computing device 130.

In step 304, verification program 132 prompts the user to determine whether the transaction details displayed on computing device 130 are consistent with the original transaction request. The transaction details displayed on computing device 130 are consistent with the original transaction when each object of the original transaction can be matched to a displayed transaction detail from the scanned and decoded QR code.

If, in step 304, the user confirms the transaction details displayed on computing device 130 are consistent with the original transaction request, then in step 306, verification program 132 sends a confirmation message to transaction server 140 using an out of band channel (i.e., the mobile device's data connection, SMS, initiate a call back, etc.). In this exemplary embodiment, as verification program 132 uses an alternate communication path to transmit confirmation, any possible MITM would be avoided during the confirmation step (step 304). The MITM cannot access the out of band channel because the out of band channel is not directly associated with the access path to the application or data used in the online transaction. In addition, as computing device 130 is pre-registered with transaction server 140, the confirmation message from verification program 132 provides an additional authentication. For example, when using computing device 120 to conduct an online banking transaction, transaction server 140 prompts the user for authentication (i.e., username and password). Thus, sending confirmation using computing device 130, which is pre-registered with transaction server 140, provides an additional authentication (in addition to username and password authentication). In this exemplary embodiment, transaction server 140 encrypts transaction details with its private key before generating the QR code and verification program 132 decrypts transaction details with transaction server 140 corresponding public key before displaying.

In step 308, verification program 132 receives a response that the transaction has been completed from transaction server 140. In this exemplary embodiment, transaction server 140 completes the original requested transaction when it receives the confirmation message from computing device 130 (step 306).

If, in step 304, the transaction details displayed on computing device 130 are not consistent with the original transaction request, then in step 310, verification program 132 sends an abort message to transaction server 140 using an out of band channel responsive to the user selecting an abort button.

In step 312, verification program 132 receives a response that the transaction has been aborted from transaction server 140. In this exemplary embodiment, transaction server 140 aborts the original requested transaction when it receives the abort message from computing device 130 (step 310).

Accordingly, by performing the operational steps of FIG. 2, a secure transaction may be performed by a user, using an out-of-band channel to transmit a confirmation message for the transaction, thus avoiding a MITM. By preregistering a computing device with a transaction server, the confirmation message provides an additional authentication and ensures transactional integrity.

Figure 4:
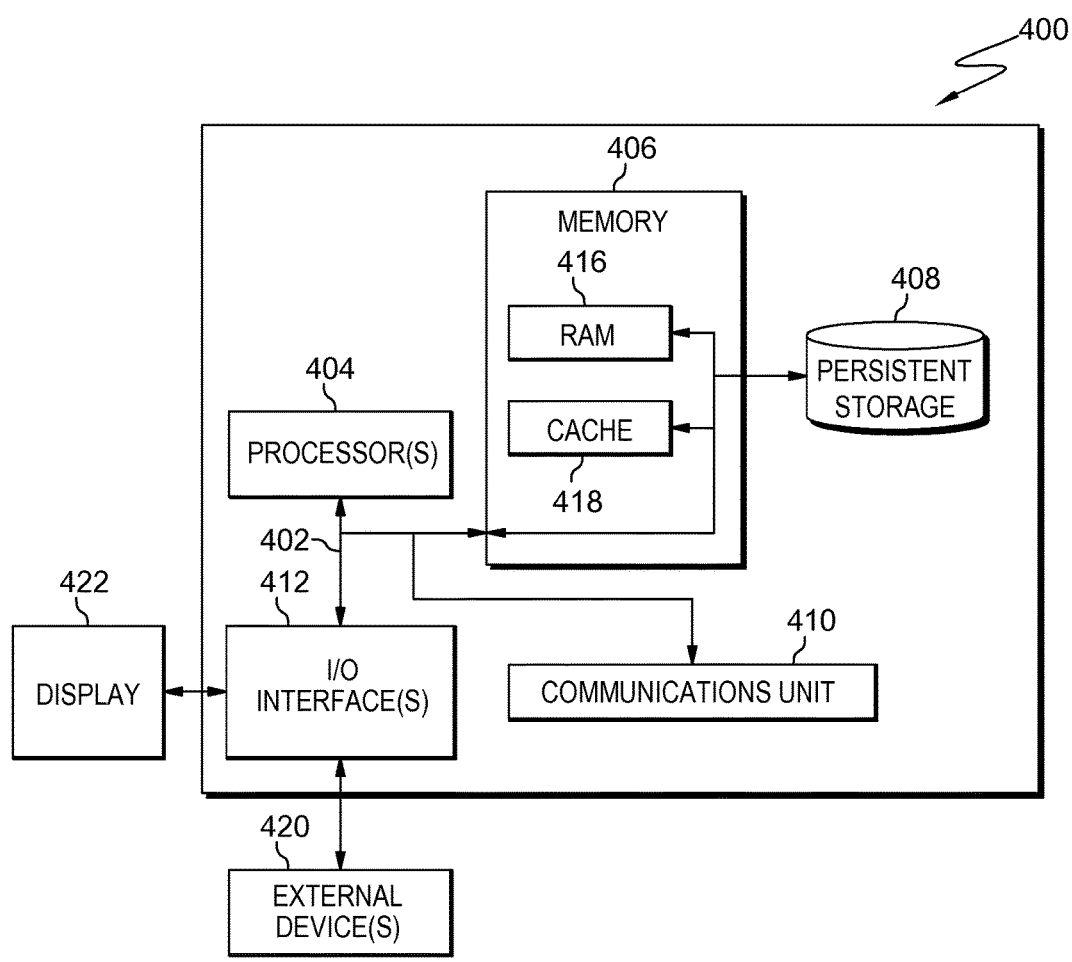
FIG. 4 is a block diagram of internal and external components of a computing device, in accordance with an embodiment of the present invention.

FIG. 4 is a block diagram of internal and external components of computing device 400, which is representative of the computing devices of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 400 includes communications fabric 402, which provides for communications between one or more processing units 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computing device 400. For example, I/O interface 412 can provide a connection to one or more external devices 420 such as a keyboard, computer mouse, touch screen, virtual keyboard, touch pad, pointing device, or other human interface devices. External devices 420 can also include portable computer readable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for verifying transactions over a network comprising:
   providing, by a first computing device details of a proposed transaction to a transaction server;
   receiving, by said first computing device a QR code, wherein the QR code comprises encoded details of the proposed transaction, in response to said providing, by a first computing device details of a proposed transaction to a transaction server;
   scanning, by said first computing device, the QR code;
   decoding, by an application of said first computing device, the QR code;
   comparing, by one or more computer processors, a set of transaction details associated with the decoded QR code to the details of the proposed transaction; and
   confirming, by a separate communication channel, the proposed transaction, wherein the separate communication channel is out of band to an access path to the application.

2. The method of claim 1, wherein said proposed transaction is conducted between a second computing device and said transaction server.

3. The method of claim 1, further comprising:
   registering, by one or more computer processors, the first computing device with said transaction server.

4. The method of claim 1, wherein said QR code contains information associated with said transaction.

5. The method of claim 1, wherein confirming the proposed transaction occurs between the first computing device and said transaction server.

6. The method of claim 1, wherein confirming the proposed transaction comprises:
   prompting, by one or more computer processors, a determination of whether said set of transaction details associated with the QR code matches the details of the proposed transaction; and
   responsive to receiving an indication that said set of transaction details associated with the QR code matches the details of the proposed transaction, sending, by one or more computer processors, a confirm message to said transaction server confirming said proposed transaction.

7. The method of claim 1, further comprising:
   prompting, by one or more computer processors, a determination of whether said set of transaction details associated with the QR code matches the details of the proposed transaction; and
   responsive to receiving an indication that said set of transaction details associated with the QR code does not match the details of the proposed transaction, sending, by one or more computer processors, an abort message to said transaction server cancelling said proposed transaction.

8. A computer program product comprising:
a computer readable storage medium and program instructions stored on the computer readable storage medium, the program instructions comprising:
program instructions to provide details of a proposed transaction to a transaction server;
program instructions to receive, a QR code, wherein the QR code comprises encoded details of the proposed transaction, in response to said program instructions to provide details of a proposed transaction to a transaction server;
program instructions to scan the QR code by a first computing device;
program instructions to decode the QR code using an application of said first computing device;
program instructions to compare a set of transaction details associated with the decoded QR code to the details of the proposed transaction; and
program instructions to confirm the proposed transaction by a separate communication channel, wherein the separate communication channel is out of band to an access path to the application used in the transaction.

9. The computer program product of claim 8, wherein said proposed transaction is conducted between a second computing device and said transaction server.

10. The computer program product of claim 8, further comprising:
program instructions to register the first computing device with said transaction server.

11. The computer program product of claim 8, wherein said QR code contains information associated with said transaction.

12. The computer program product of claim 8, wherein the program instructions to confirm the proposed transaction occurs between the first computing device and said transaction server.

13. The computer program product of claim 8, wherein the program instructions to confirm the proposed transaction comprise:
program instructions to prompt a determination of whether said set of transaction details associated with the QR code matches the details of the proposed transaction; and
program instructions to, responsive to receiving an indication that said set of transaction details associated with the QR code matches the details of the proposed transaction, send a confirm message to said transaction server confirming said proposed transaction.

14. The computer program product of claim 8, further comprising:
program instructions to prompt a determination of whether said set of transaction details associated with the QR code matches the details of the proposed transaction; and
program instructions to, responsive to receiving an indication that said set of transaction details associated with the QR code does not match the details of the proposed transaction, send an abort message to said transaction server cancelling said proposed transaction.

15. A computer system comprising:
one or more computer processors;
one or more computer readable storage media;
program instructions stored on the computer readable storage media for execution by at least one of the one or more computer processors, the program instructions comprising:
program instructions to provide details of a proposed transaction to a transaction server;
program instructions to receive a QR code, wherein the QR code comprises encoded details of the proposed transaction, in response to said program instructions to provide details of a proposed transaction to a transaction server;
program instructions to scan the QR code by a first computing device;
program instructions to decode the QR code using an application of said first computing device;
program instructions to compare a set of transaction details associated with the decoded QR code to the details of the proposed transaction; and
program instructions to confirm the proposed transaction by a separate communication channel, wherein the separate communication channel is out of band to the application used in the transaction.

16. The computer system of claim 15, wherein said proposed transaction is conducted between a second computing device and said transaction server.

17. The computer system of claim 15, further comprising:
program instructions to register the first computing device with said transaction server.

18. The computer system of claim 15, wherein the program instructions to confirm the proposed transaction occurs between the first computing device and said transaction server.

19. The computer system of claim 15, wherein the program instructions to confirm the proposed transaction comprise:
program instructions to prompt a determination of whether said set of transaction details associated with the QR code matches the details of the proposed transaction; and
program instructions to, responsive to receiving an indication that said set of transaction details associated with the QR code matches the details of the proposed transaction, send a confirm message to said transaction server confirming said proposed transaction.

20. The computer system of claim 15, further comprising:
program instructions to prompt a determination of whether said set of transaction details associated with the QR code matches the details of the proposed transaction; and
program instructions to, responsive to receiving an indication that said set of transaction details associated with the QR code does not match the details of the proposed transaction, send an abort message to said transaction server cancelling said proposed transaction.

* * * * *